United States Patent [19]

Ishiwata

[11] Patent Number: 5,717,874
[45] Date of Patent: Feb. 10, 1998

[54] APPARATUS FOR DATA TRANSFER BETWEEN IMAGE MEMORY AND EXTERNAL I/O DEVICE WHEREIN INNER REGISTERS SET THE IMAGE VALID AREA, DIRECTION AND MODER OF TRANSFER

[75] Inventor: Masahiro Ishiwata, Kanagawa, Japan

[73] Assignee: Fuji Xerox Co., Ltd., Tokyo, Japan

[21] Appl. No.: 426,290

[22] Filed: Apr. 19, 1995

[30] Foreign Application Priority Data

May 31, 1994 [JP] Japan ................... 6-118499

[51] Int. Cl.⁶ ................... G06F 3/00; G06F 13/38; G06F 13/40
[52] U.S. Cl. ................... 395/307; 395/114; 395/526; 395/851; 395/885; 364/240.3; 364/240.5
[58] Field of Search ................... 395/106, 115, 395/114, 307, 526, 851, 885; 379/279; 364/200, 900, 519, 240.3, 240.5; 358/515, 500, 456, 448, 164, 444; 349/19

[56] References Cited

U.S. PATENT DOCUMENTS

| | | | |
|---|---|---|---|
| 4,435,763 | 3/1984 | Bellay et al. | 364/200 |
| 4,905,097 | 2/1990 | Watanabe et al. | 358/456 |
| 4,989,163 | 1/1991 | Kawamata et al. | 364/519 |
| 5,058,051 | 10/1991 | Brooks | 364/900 |
| 5,146,328 | 9/1992 | Yamasaki et al. | 358/164 |
| 5,204,759 | 4/1993 | Sakai et al. | 358/444 |
| 5,245,417 | 9/1993 | Hibi et al. | 358/515 |
| 5,280,348 | 1/1994 | Honma et al. | 358/500 |
| 5,317,426 | 5/1994 | Hoshino | 358/515 |
| 5,355,159 | 10/1994 | Kaneko | 349/19 |
| 5,438,648 | 8/1995 | Takaoka et al. | 395/106 |
| 5,448,376 | 9/1995 | Ohta | 358/448 |

FOREIGN PATENT DOCUMENTS

| | | |
|---|---|---|
| 5-128060 | 5/1993 | Japan . |
| 5-240917 | 9/1993 | Japan . |

*Primary Examiner*—Thomas C. Lee
*Assistant Examiner*—Ki S. Kim
*Attorney, Agent, or Firm*—Finnegan, Henderson, Farabow, Garrett & Dunner, L.L.P.

[57] ABSTRACT

In an image input/output control apparatus having three lines of n-bit bidirectional data buses provided on an external apparatus connection side of the apparatus and four lines of n-bit bidirectional data buses provided on an image memory side of the apparatus, there are provided a first inner register for setting the data transfer direction of each of the bidirectional data buses and a second inner register for setting an image valid area, whereby the data transfer direction of each of the bidirectional data buses is determined by a set point of the first inner register and the image valid area is determined by a set point of the second inner register.

3 Claims, 13 Drawing Sheets

FIG. 7

| (MSB) | | | | | | | (LSB) |
|---|---|---|---|---|---|---|---|
| D7 | D6 | D5 | D4 | D3 | D2 | D1 | D0 |
| COLMD1 | COLMD0 | × | × | MODE3 | MODE2 | MODE1 | MODE0 |

FIG. 8A

| (MSB) | | | | | | | (LSB) |
|---|---|---|---|---|---|---|---|
| D7 | D6 | D5 | D4 | D3 | D2 | D1 | D0 |
| SADR7 | SADR6 | SADR5 | SADR4 | SADR3 | SADR2 | SADR1 | SADR0 |

FIG. 8B

| (MSB) | | | | | | | (LSB) |
|---|---|---|---|---|---|---|---|
| D7 | D6 | D5 | D4 | D3 | D2 | D1 | D0 |
| × | × | SADR13 | SADR12 | SADR11 | SADR10 | SADR9 | SADR8 |

FIG. 9A

| (MSB) | | | | | | | (LSB) |
|---|---|---|---|---|---|---|---|
| D7 | D6 | D5 | D4 | D3 | D2 | D1 | D0 |
| EADR7 | EADR6 | EADR5 | EADR4 | EADR3 | EADR2 | EADR1 | EADR0 |

FIG. 9B

| (MSB) | | | | | | | (LSB) |
|---|---|---|---|---|---|---|---|
| D7 | D6 | D5 | D4 | D3 | D2 | D1 | D0 |
| × | × | EADR13 | EADR12 | EADR11 | EADR10 | EADR9 | EADR8 |

FIG. 10A

| (MSB) | | | | | | | (LSB) |
|---|---|---|---|---|---|---|---|
| D7 | D6 | D5 | D4 | D3 | D2 | D1 | D0 |
| AREAS7 | AREAS6 | AREAS5 | AREAS4 | AREAS3 | X | X | X |

NOTE: NOT USE OUTPUT "0" AT THE TIME OF "READ."

FIG. 10B

| (MSB) | | | | | | | (LSB) |
|---|---|---|---|---|---|---|---|
| D7 | D6 | D5 | D4 | D3 | D2 | D1 | D0 |
| AREAS15 | AREAS14 | AREAS13 | AREAS12 | AREAS11 | AREAS10 | AREAS9 | AREAS8 |

FIG. 11A

| (MSB) | | | | | | | (LSB) |
|---|---|---|---|---|---|---|---|
| D7 | D6 | D5 | D4 | D3 | D2 | D1 | D0 |
| AREAE7 | AREAE6 | AREAE5 | AREAE4 | AREAE3 | X | X | X |

NOTE: NOT USE OUTPUT "1" AT THE TIME OF "READ."

FIG. 11B

| (MSB) | | | | | | | (LSB) |
|---|---|---|---|---|---|---|---|
| D7 | D6 | D5 | D4 | D3 | D2 | D1 | D0 |
| AREAE15 | AREAE14 | AREAE13 | AREAE12 | AREAE11 | AREAE10 | AREAE9 | AREAE8 |

APPARATUS FOR DATA TRANSFER BETWEEN IMAGE MEMORY AND EXTERNAL I/O DEVICE WHEREIN INNER REGISTERS SET THE IMAGE VALID AREA, DIRECTION AND MODER OF TRANSFER

BACKGROUND OF THE INVENTION

1. Field of the Invention

The present invention relates to an image input/output control apparatus, and particularly relates to image input/output control apparatus in a data processing system having plural lines of bidirectional data buses.

2. Description of the Related Art

Conventionally, in a general-purpose input/output control apparatus, control is carried out in a dialogue manner by using a data valid signal indicating whether data are valid or not, an affirmative signal indicating that the data input/output has been carried out properly, and a denial signal indicating that the data input has been carried improperly, as disclosed in Japanese Patent Unexamined Publication No. 60-68451, and it is general that one input/output device is used for bidirectional data buses of one line and if there are a plurality of lines of bidirectional data buses, input/output devices of the number corresponding to the number of the lines of bidirectional data buses are required.

If an external apparatus is a copying machine and when the output data of the copying machine are to be stored in an image memory through an i/o device, or when the image data in the image memory are to be transferred or supplied to the copying machine so as to use the copying machine as a printer, however, there may occur a case where it is too late for such control in a dialogue manner to be in time because the transfer of the image data must be carried out in real time.

Further, data of Y, M, C and K are transferred sequentially area by area when the output data of the copying machine are to be stored in the image memory through the i/o device, while it is necessary that signals L*, a*, b* and so on which have been converted from the Y, M, C and K signals are transferred to the three lines of bidirectional data buses at the same time when image data in the image memory are to be outputted from the copying machine. Accordingly, the system becomes large in size when such a system is to be realized, because it is required to provide a plurality of i/o devices and a controller for controlling the i/o devices. Further, when image data which are different in size are to be stored in an image memory through an i/o device, it is necessary to make the data valid signal indicating the validity of data correspond to the size of the image data.

SUMMARY OF THE INVENTION

The present invention has been made to eliminate above-mentioned defects in the conventional apparatus, and an object of the invention is to provide an image input/output control apparatus in which data transfer between an external apparatus and an image memory through plural lines of bidirectional data buses is controlled by one input/output controller so that the system can be reduced in size and data transfer in real time can be carried out.

In order to achieve the above object, according to the present invention, the image input/output control apparatus comprises: three lines of n-bit bidirectional data buses provided on an external apparatus connection side of the apparatus; four line of n-bit bidirectional data buses provided on an image memory side of the apparatus; a first inner register for setting the data transfer direction of each of the bidirectional data buses; and a second inner register for setting an image valid area, whereby the data transfer direction of each of the bidirectional data buses is determined by a set point of the first inner register and the image valid area is determined by a set point of the second inner register.

Preferably, in the image input/output control apparatus, the bidirectional data buses have a first mode in which data inputted to one of the three lines of bidirectional data buses on the external apparatus connection side are supplied to the four lines of bidirectional data buses on the image memory side sequentially one line by one line, a second mode in which data inputted to the four lines of bidirectional data buses on the image memory side sequentially one line by one line are supplied to one of the three lines of bidirectional data buses on the external apparatus connection side, a third mode in which data inputted to the three lines of bidirectional data buses on the external apparatus connection side are supplied three of the four lines of bidirectional data buses on the image memory side, and a fourth mode in which data inputted to three of the four lines of bidirectional data buses on the image memory side are supplied to the three lines of bidirectional data buses on the external apparatus connection side.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

FIG. 7 is a diagram showing the inner register for setting the bus input/output direction and setting data transfer manner;

FIGS. 8A and 8B are diagrams showing the registers for setting the start point of the line direction valid image area;

FIGS. 9A and 9B are diagrams showing the registers for setting the period of the line direction valid image area;

FIGS. 10A and 10B are diagrams showing the registers for setting the start point of the page direction valid image area;

FIGS. 11A and 11B are diagrams showing the registers for setting the period of the page direction valid image area;

DESCRIPTION OF THE PREFERRED EMBODIMENTS

Figure 1:
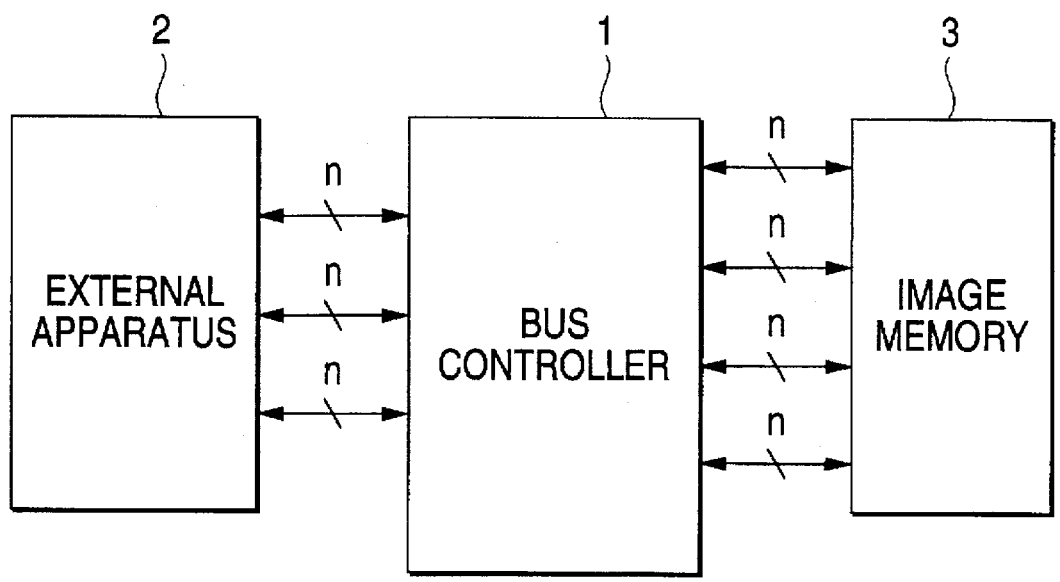
FIG. 1 is a basic conceptional diagram showing an image input/output control apparatus according to the present invention.

Referring to FIG. 1, the conception of the present invention will be described prior to the description of the preferred embodiments.

As seen in FIG. 1, a bus controller 1 is provided with three lines of n-bit bidirectional data buses on its connection side with an external apparatus 2 and four lines of n-bit bidirectional data buses at its connection side with an image memory 3 so that input/output of the bidirectional data buses are controlled by the signal bus controller 1. In the bus controller 1, the image data transfer direction on each bidirectional data bus and an input/output mode, such as a mono-color mode, a tri-color mode or a full-color mode, are freely set by writing a value in an inner register, and an image data valid area is set in the inner register so that a desired area of the image data is transferred to the image memory 3. A horizontal synchronizing signal, a vertical synchronizing signal, a video signal and a clock signal are inputted from the external apparatus 2, an inner counter is operated by those input signals, and the count value of the inner counter is compared with the value of the register so that the valid area of the image data is set.

According to the present invention, when a value is set in the register inside the bus controller 1, the set point is decoded in an inner circuit so that the direction of each of the bidirectional data buses is determined. Although data are always inputted/outputted into/from each of the bidirectional data buses, write and read signals indicating the data valid area are outputted on the bidirectional data buses on the image memory 3 side so that the write and read signals are selectively enabled/disabled to thereby determine the mode in which data are to be outputted to which one/ones of lines of the bidirectional data buses from the three lines of bidirectional data buses on the external apparatus 2 side or from the four lines of bidirectional data buses on the image memory 3 side.

By referring the drawings, an embodiment of the present invention will be described hereunder.

Figure 2:
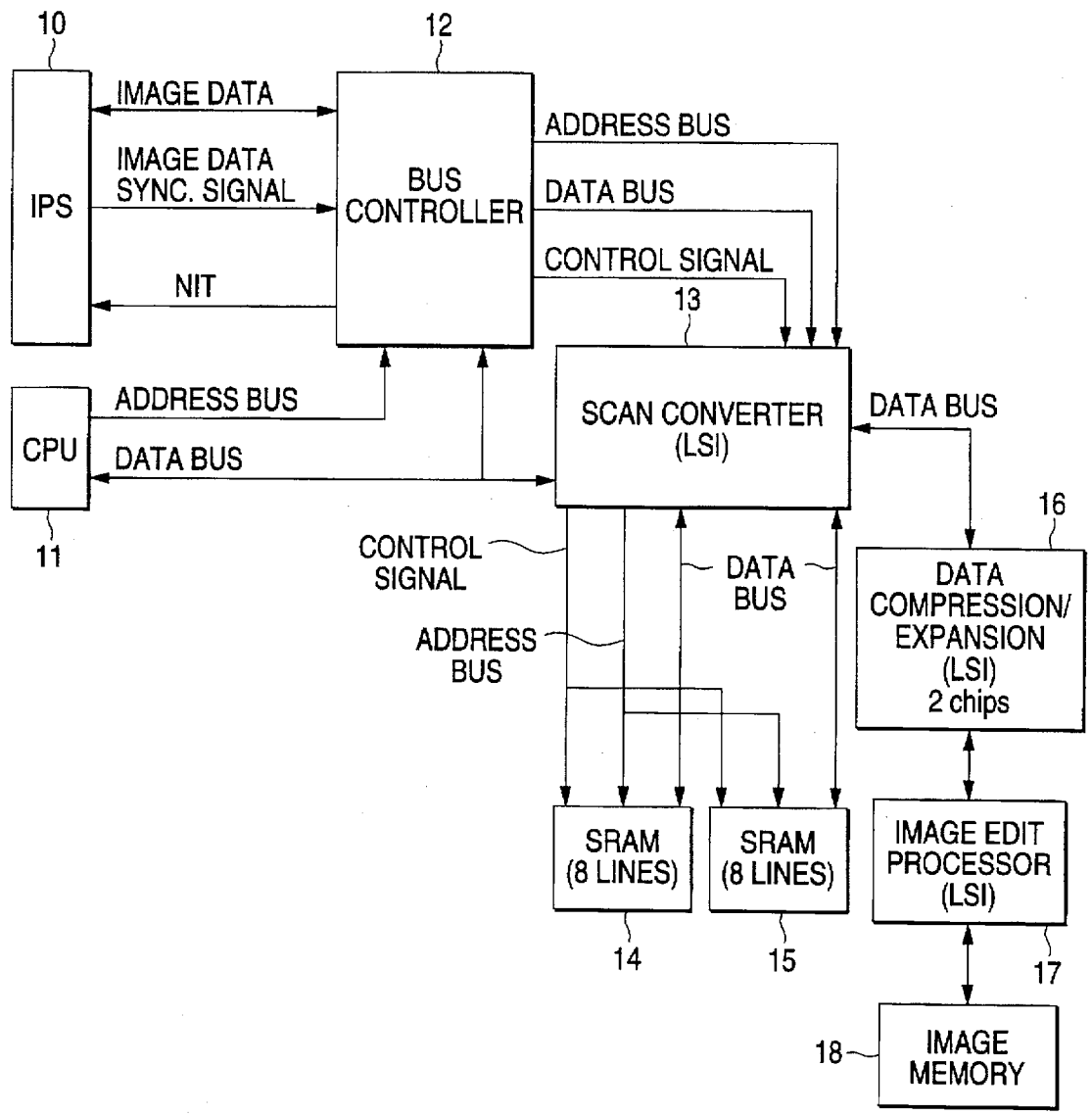
FIG. 2 is a block diagram showing the basic configuration of the image input/output control apparatus according to the present invention.

FIG. 2 is a block diagram showing the basic configuration of the image input/output control apparatus according to the present invention. A bus controller 12 is controlled by a CPU 11 to perform control of input/output between an image processing system (hereinafter abbreviated to "IPS") 10 and an image memory 18, so that, for example, in the case where the IPS 10 is an image processing portion of a copying machine, an original is read out by a not-shown image reader and the read-out image data is written into an image memory 18, while in the case where the copying machine is used as a printer, image data written in the image memory 18 is transferred to the copying machine. The data writing into the image memory 18 is carried out in such a manner that data are compressed in a data compression/expansion circuit 16 and then written into the image memory 18 through a image edit processor 17 having functions of repeat, copy, rotation and so on. The data compression/expansion circuit 16 carries out processing by 8×8 pixel block, and to this end, a scan converter 13 uses a pair of 8-line buffer memories 14 and 15 alternatively so as to generate an 8×8 image block alternatively. At the time of reading data from the image memory 18, the compressed data are expanded by the data compression/expansion circuit 16.

Figure 3:
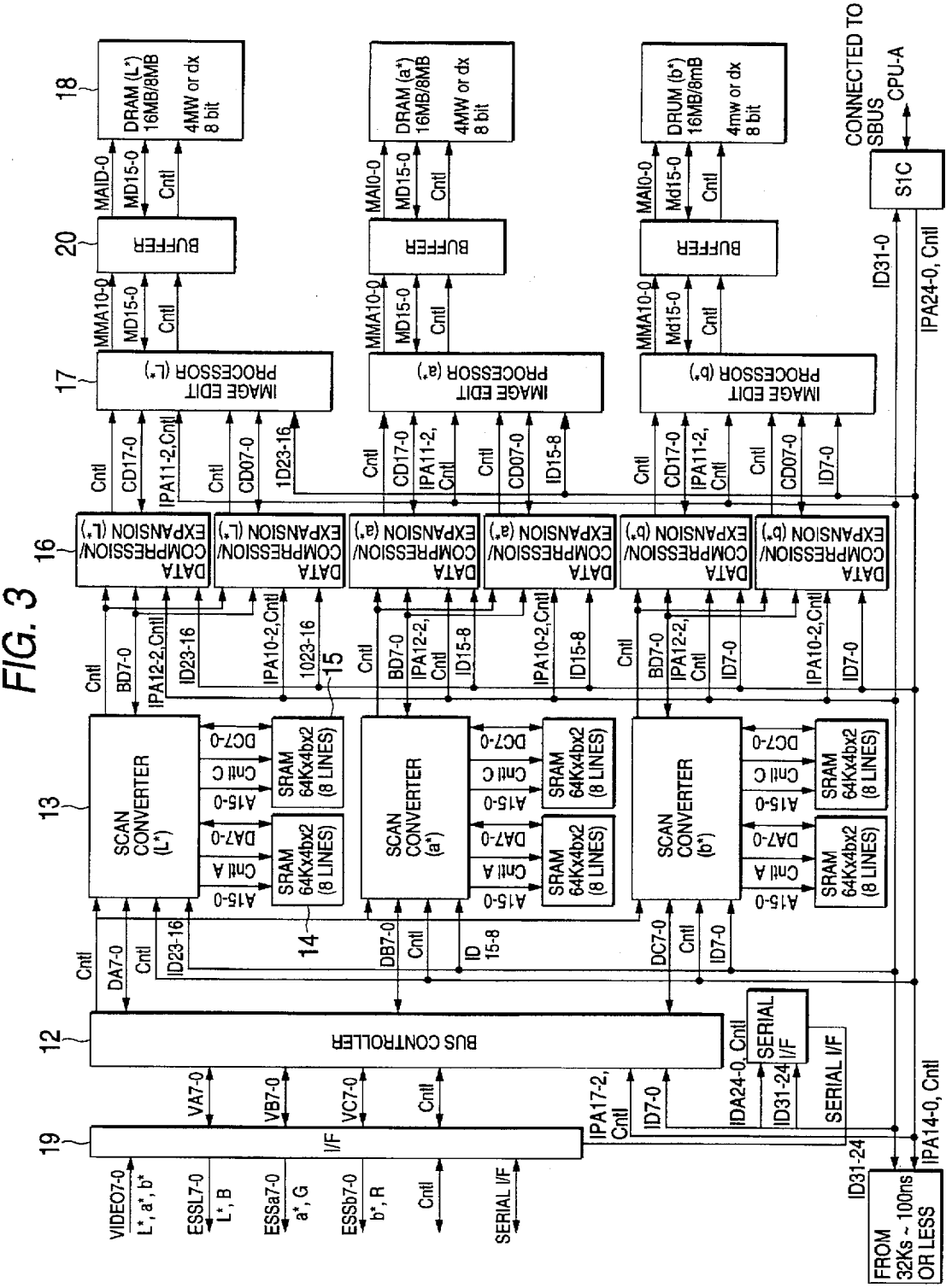
FIG. 3 is a block diagram showing an image input/output control apparatus according to an embodiment of the present invention.

FIG. 3 is a diagram showing a detailed, specific embodiment of the apparatus shown in FIG. 2. Image data (R, G, B, L*, a*, b*, etc.) from IPS are transferred to a bus controller 12 through a interface 19, while the data on the image memory side are transferred to the IPS through the interface 19. A scan converter 13, buffer memories 14, 15 a data compression/expansion circuit 16, an image edit processor 17, an image memory 18 are provided for each of the L*, a* and b* signals. A buffer 20 is provided for timing adjustment of read/write from/to the image memory 18 by means of the image edit processor 17.

Figure 4:
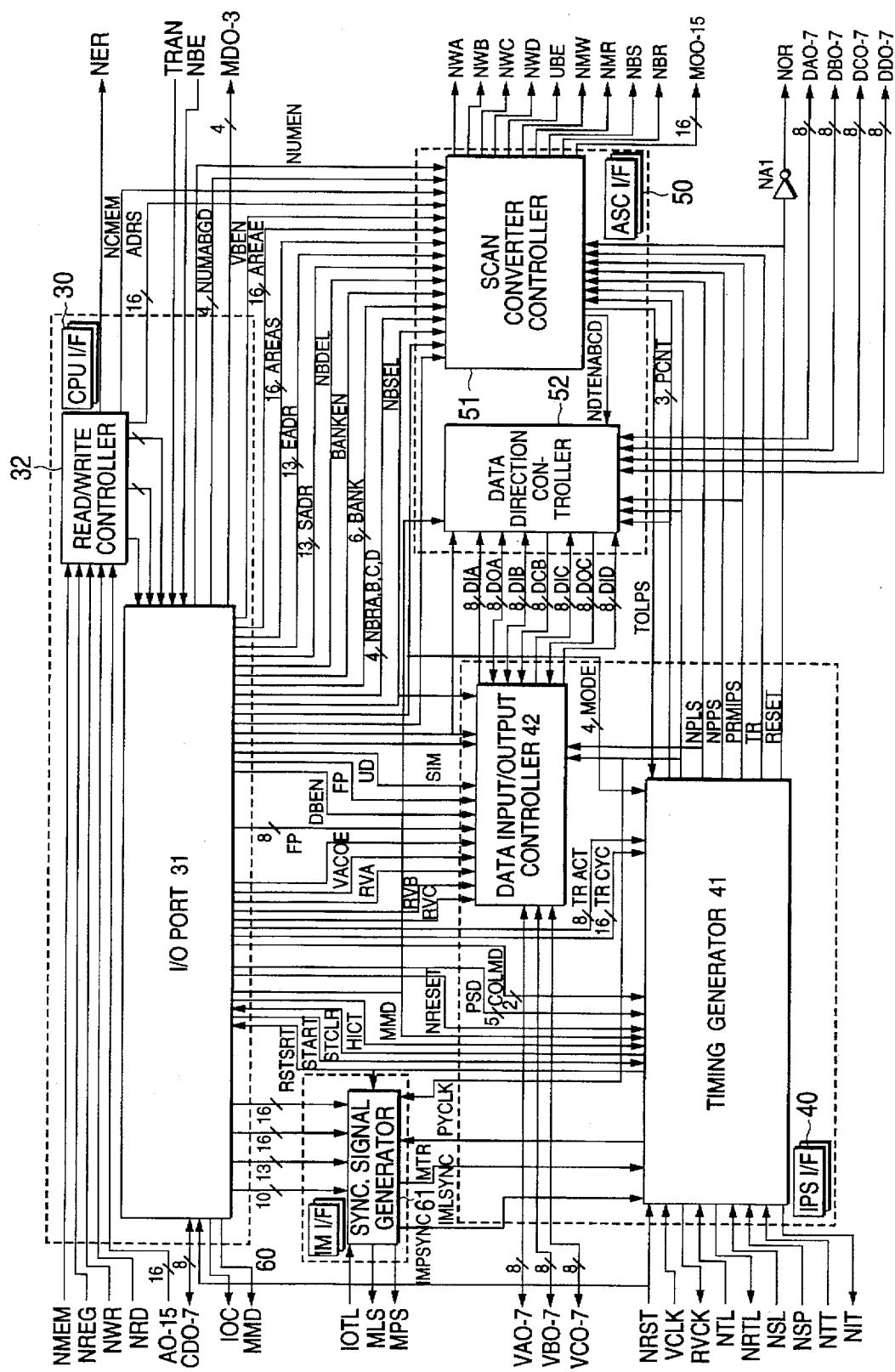
FIG. 4 is a block diagram showing the configuration of the bus controller.

FIG. 4 is a block diagram showing the inside of the bus controller. The bus controller is constituted by a CPU interface 30, an IPS interface 40, a scan converter interface 50, and an IM interface 60. The CPU interface 30 is constituted by an input/output (I/O) port 31, and a read/write controller 32. The I/O port 31 is provided with a register for setting the input/output mode and the data transfer direction, and a register for setting a data valid range as will be described later. The read/write controller 32 generates write and read signals for indicating the data valid range on the basis of the set point of the register. The IPS interface 40 is constituted by a timing controller 41 and a data input/output controller 42. In response to a reset signal, a video clock, and a line synchronizing signal, the timing controller 41 generates various timing signals with respect to the data transfer. In response to a control signal from the I/O port 31, the data input/output controller 42 controls the data buses VA0-7, VB0-7, and VC0-7 on the copying machine side, the data buses DOA, DOB, and DOC from the memory side, and the data buses DIA, DIB, DIC and DID to the memory side. The scan converter interface 50 is constituted by a scan-converter controller 51, and a data-direction controller 52. In response to a signal from the read/write controller 32, the scan-converter controller 51 outputs a read/write signal and the data-direction controller 52 determines the data bus direction. The IM interface 60 is provided with a synchronizing signal generator 61 which outputs a line synchronizing signal and a page synchronizing signal in response to the timing signal from the timing controller 41.

Figure 5:
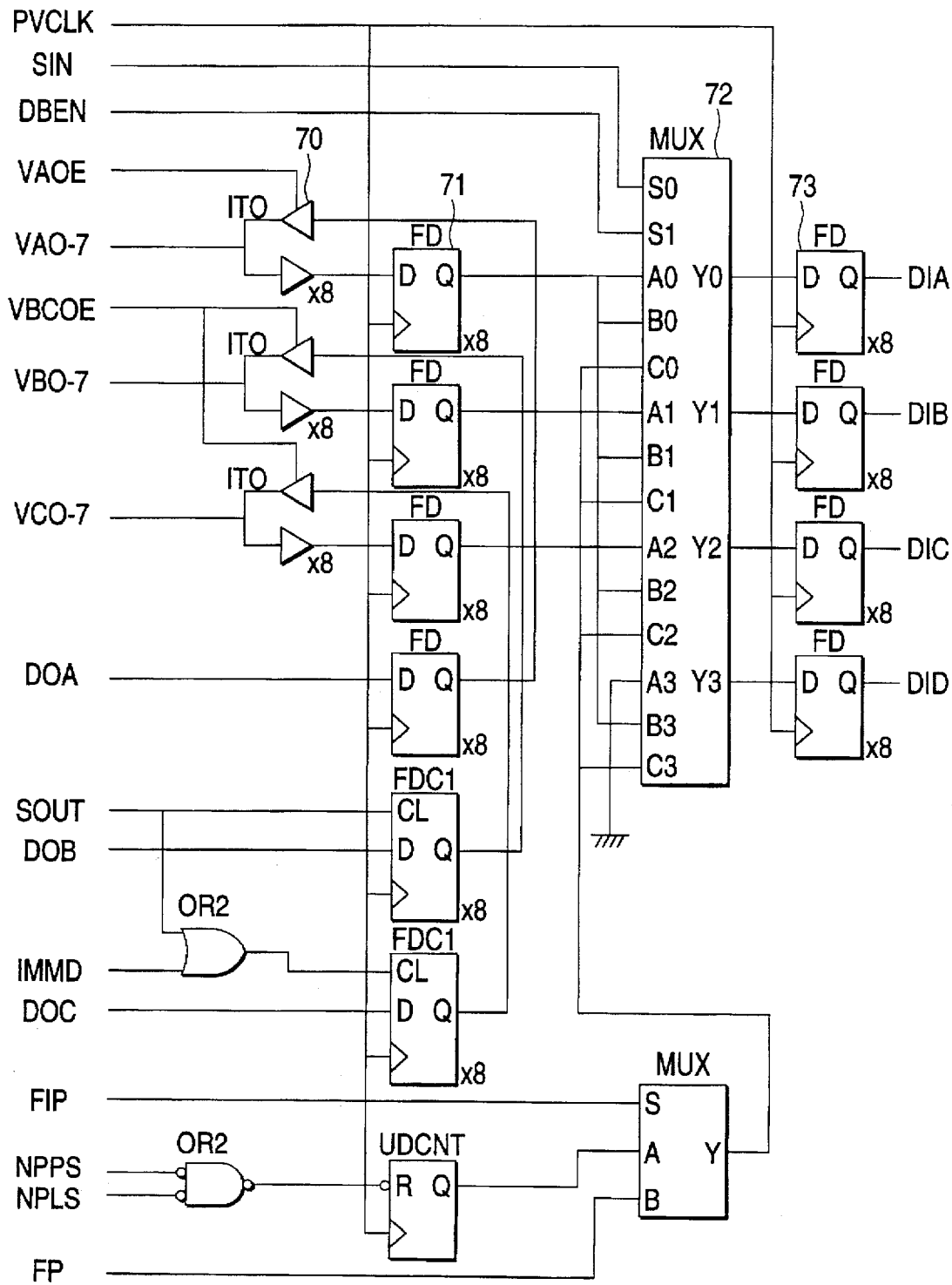
FIG. 5 is a block diagram showing the configuration of the data input/output controller.

FIG. 5 is a block diagram showing the configuration of the data input/output controller 42.

As described above, VA0-7, VB0-7, and VC0-7 are the copying machine side data buses, and bidirectional buffers 70 are switched by signals VAOE and VBCOE obtained by decoding the mode setting in an inner register which will be described later so that the illustrated terminals VA0-7, VB0-7, and VC0-7 are made to be input or output terminals. The bidirectional buffers 70 are provided in three systems on the copying machine side. In the case where the terminals VA0-7, VB0-7, and VC0-7 are made to be in the input mode, the image data from the copying machine are taken into latch circuits 71 and outputted to the memory side data buses DIA, DIB, DIC, and DID through a switch circuit (MUX) 72, and latch circuits 73. The switch circuit 72 is changed over whether is should transfer the data sequentially area by area or at a time in response to SIN and DBEN signals which indicate bit names of the inner register respectively. When the direction of the direction od the bidirectional buffers 70 is reversed, the image data from the data buses DOA, DOB, and DOC returning from the memory side are outputted to the terminals VA0-7, VB0-7, and VC0-7 through the latch circuits 71 and the bidirectional buffers 70. Further, in FIG. 5, PVCLK is a clock signal, NPPS is a page synchronizing signal of an external input, and NPLS is a line synchronizing signal.

Figure 6:
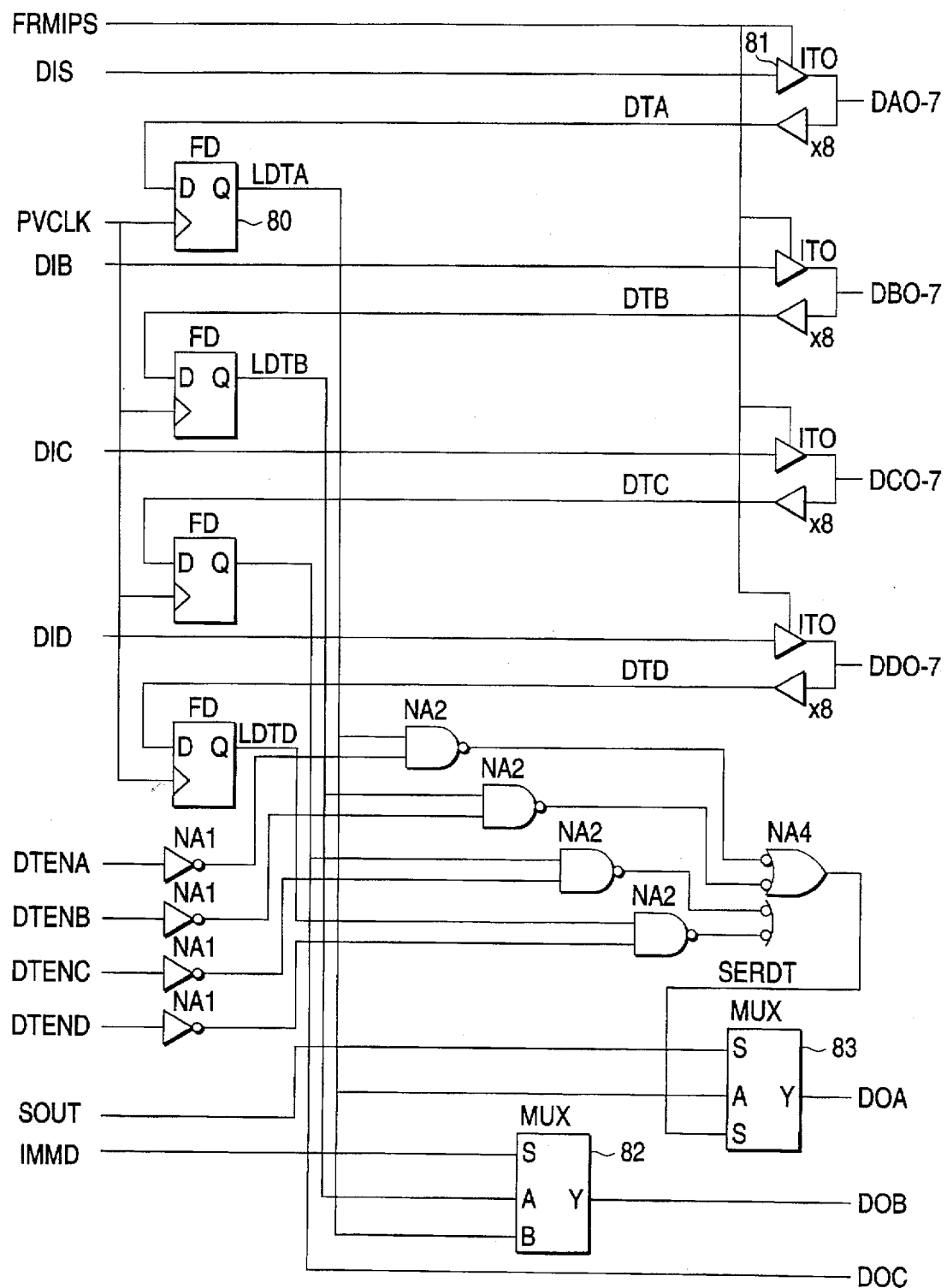
FIG. 6 is a block diagram showing the configuration of the data direction controller.

FIG. 6 is a block diagram showing the configuration of the data-direction controller 52.

In the case of data transfer to the memory side, the image data from the data buses DIA, DIB, DIC, and DID are transferred to the memory side through bidirectional buses 81, and data buses DA0-7, DB0-7, DC0-7, and DD0-7, while in the case of data transfer from the memory side to the copying machine side, the image data from the data buses DA0-7, DB0-7, DC0-7, and DD0-7 are transferred to the copying machine side, similarly to the above case of FIG. 5, through the bidirectional buses 81, latch circuits 80, switch circuits 82 and 83, and data buses DOA, DOB, and DOC. The bidirectional data buses on the image memory side are provided in four systems, and use/not-use of and the use order of the bidirectional data buses can be determined in accordance with the set point of an inner register which will be described later.

FIG. 7 is a view showing a register provided in the bus controller so as to designate the input/output direction of the buses and the manner of data transfer.

The register is composed of 8 bits so that the input/output direction of the buses is set by the bits D0–D3 and the manner of data transfer is set by the bits D6 and D7. That is, the input/output mode in which the image data are inputted/outputted into/from the terminals VA0-7, VB0-7, and VC0-7 (copying machine side) is set by the bits D7 and D6 and the contents of the setting are as shown in the following Table 1.

TABLE 1

| D7 | D6 | I/O mode | Operation |
|---|---|---|---|
| 0 | 0 | mono-color | Image data are inputted/outputted in a page sync active period of one cycle. |
| 1 | 0 | tri-color | Image data are inputted/outputted in a page sync active period of three cycles. |
| 1 | 1 | full-color | Image data are inputted/outputted in a page sync active period of four cycles. This mode can be set when image data are inputted/outputted sequentially area by area. | where (0,1) cannot be set.

Next, the input/output direction set by D0–D3 are as shown in Table 2.

TABLE 2

| MODE | | | | Data bus I/O | |
|---|---|---|---|---|---|
| | | | | VA0-7 VB0-7 | DA0-7 DB0-7 DC0-7 |
| D3 | D2 | D1 | D0 | VC0-7 | DD0-7 |
| 0 | 0 | 0 | 0 | IN | IN |
| 0 | 0 | 0 | 1 | IN | IN |
| 0 | 0 | 1 | 0 | IN | IN |
| 0 | 0 | 1 | 1 | IN | IN |
| 0 | 1 | 0 | 0 | IN | OUT |
| 0 | 1 | 0 | 1 | IN | OUT |
| 0 | 1 | 1 | 0 | IN | OUT |
| 0 | 1 | 1 | 1 | IN | OUT |
| 1 | 0 | 0 | X | IN | IN |
| 1 | 0 | 1 | X | OUT | IN |
| 0 | 1 | X | X | IN | IN |

Further, it is possible to set the angle at the time of image rotating processing by using the bits D0–D3, or to determine the use/not-use of any of the bidirectional data buses 81 shown in FIG. 6.

Next, referring to FIGS. 8–12, the registers provided in the bus controller 12 for setting the image data valid range will be described below.

Figure 12:
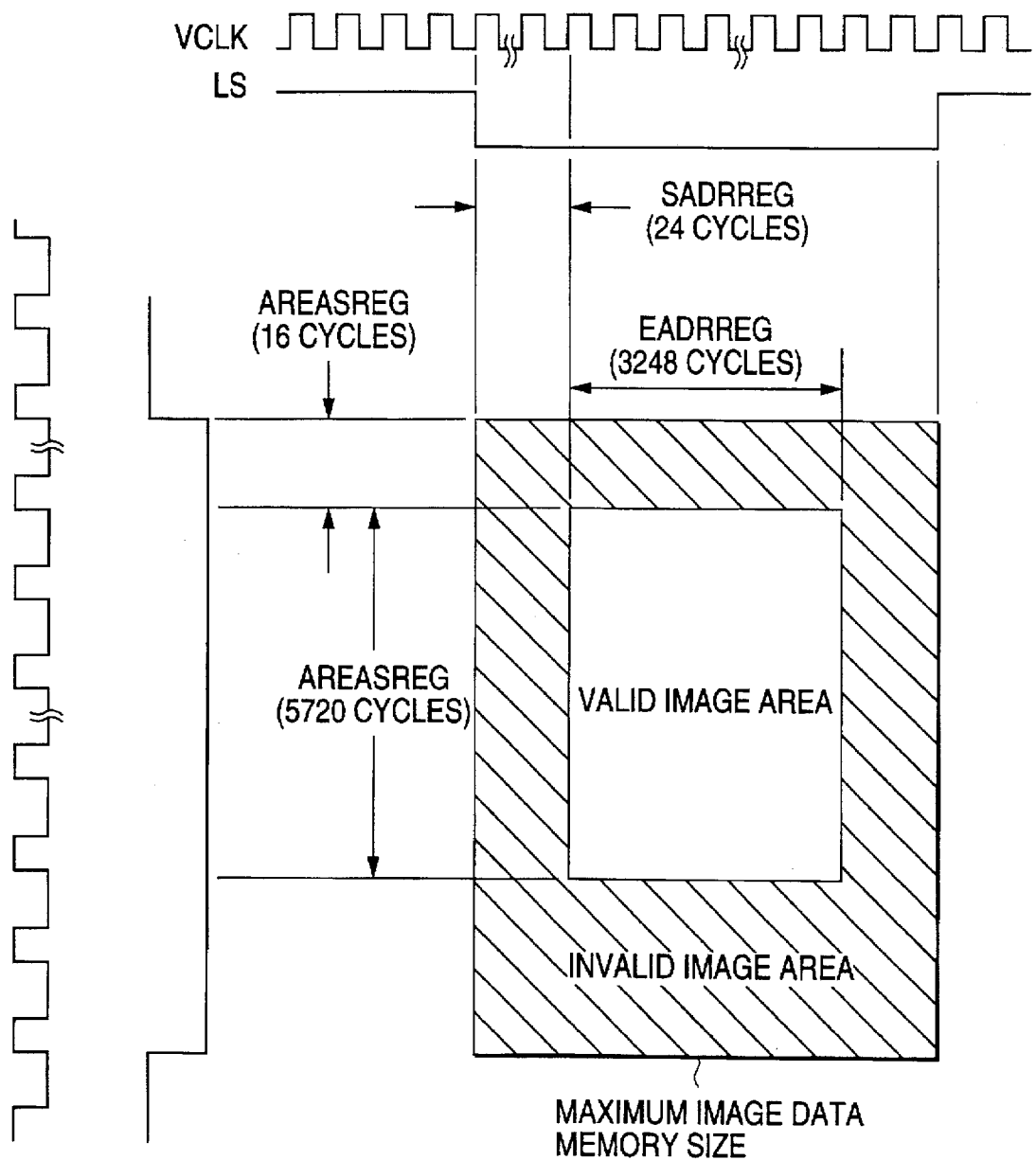
FIG. 12 is a diagram showing the valid image area.

FIGS. 8A and 8B shown registers for setting a valid image area start point in the line direction, and the number of cycles of a VCLK signal between an active start point of a line synchronizing signal and a valid image area start point is made to be a set point as shown in FIG. 12, so that the lower bites of the set point are stored in a lower address register (FIG. 8A) and the upper bites of the set point are stored in a higher address register (FIG. 8B). The judgment as to whether the number of cycles of the VCLK signal is made to be a set point or not is conducted by an inner counter in a manner so that the number of cycles of the VCLK signal is counted by the inner counter and the count value is compared with the set point.

FIGS. 9A and 9B show registers for setting a valid image area period in the line direction, and the number of cycles of the VCLK signal in the valid image area period is made to be a set point as shown in FIG. 12, so that the lower bites of the set point are stored in a lower address register (FIG. 9A) and the upper bites of the set point are stored in a higher address register (FIG. 9B). Similarly to the above case, the judgment as to whether the number of cycles of the VCLK signal is made to be a set point or not is conducted by an inner counter in a manner so that the number of cycles of the VCLK signal is counted by the inner counter and the count value is compared with the set point.

FIGS. 10A and 10B show registers for setting an image area start point in the page direction, and the number of cycles of the line synchronizing signal between an active start point of a page synchronizing signal and a valid image area start point is made to be a set point as shown in FIG. 12, so that the lower bites of the set point are stored in a lower address register (FIG. 10A) and the upper bites of the set point are stored in a higher address register (FIG. 10B). In this case, similarly to above case, the judgment as to whether the number of cycles of the line synchronizing signal is made to be a set point or not is conducted by an inner counter in a manner so that the number of cycles of the line synchronizing signal is counted by the inner counter and the count value is compared with the set point.

FIGS. 11A and 11B show registers for setting a valid image area period in the page direction, and the number of cycles of the line synchronizing signal in the valid image area period is made to be a set point as shown in FIG. 12, so that the lower bites of the set point are stored in a lower address register (FIG. 11A) and the upper bites of the set point are stored in a higher address register (FIG. 11B). Similarly to the above case, the judgment as to whether the number of cycles of the line synchronizing signal is made to be a set point or not is conducted by an inner counter in a manner so that the number of cycles of the line synchronizing signal is counted by the inner counter and the count value is compared with the set point.

Thus, the valid image area is set as shown in FIG. 12.

Figure 13:
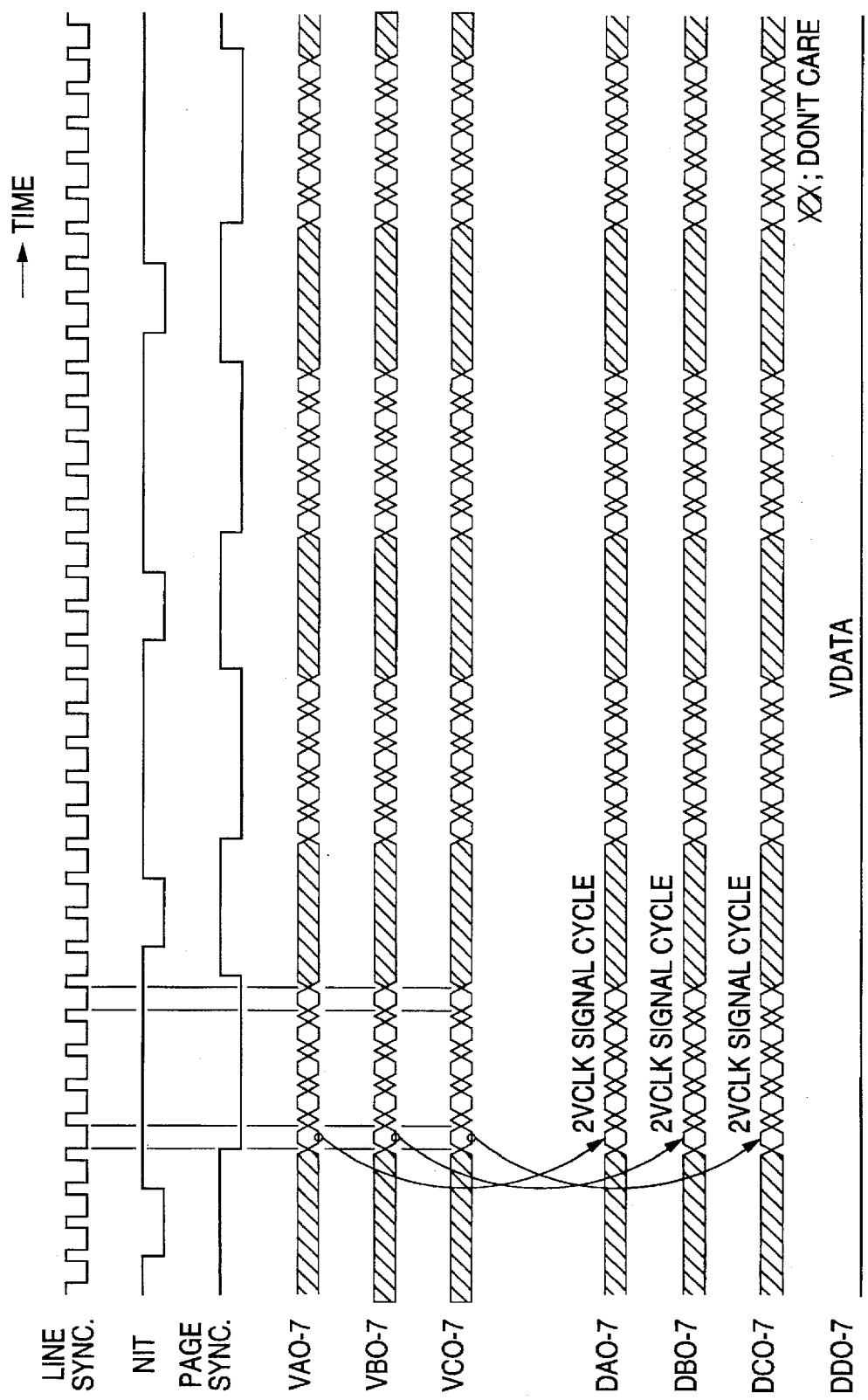
FIG. 13 is a diagram for explaining the data transfer.

FIG. 13 shows the data transfer when the bits (D7, D6) shown in FIG. 7 are set to be (0, 0). The data of the buses VA0-7, VB0-7, and VC0-7 on the IPS side are transferred to the buses DA0-7, DB0-7, and DC0-7 on the memory side in the period of one cycle of the page synchronizing signal.

Figure 14:
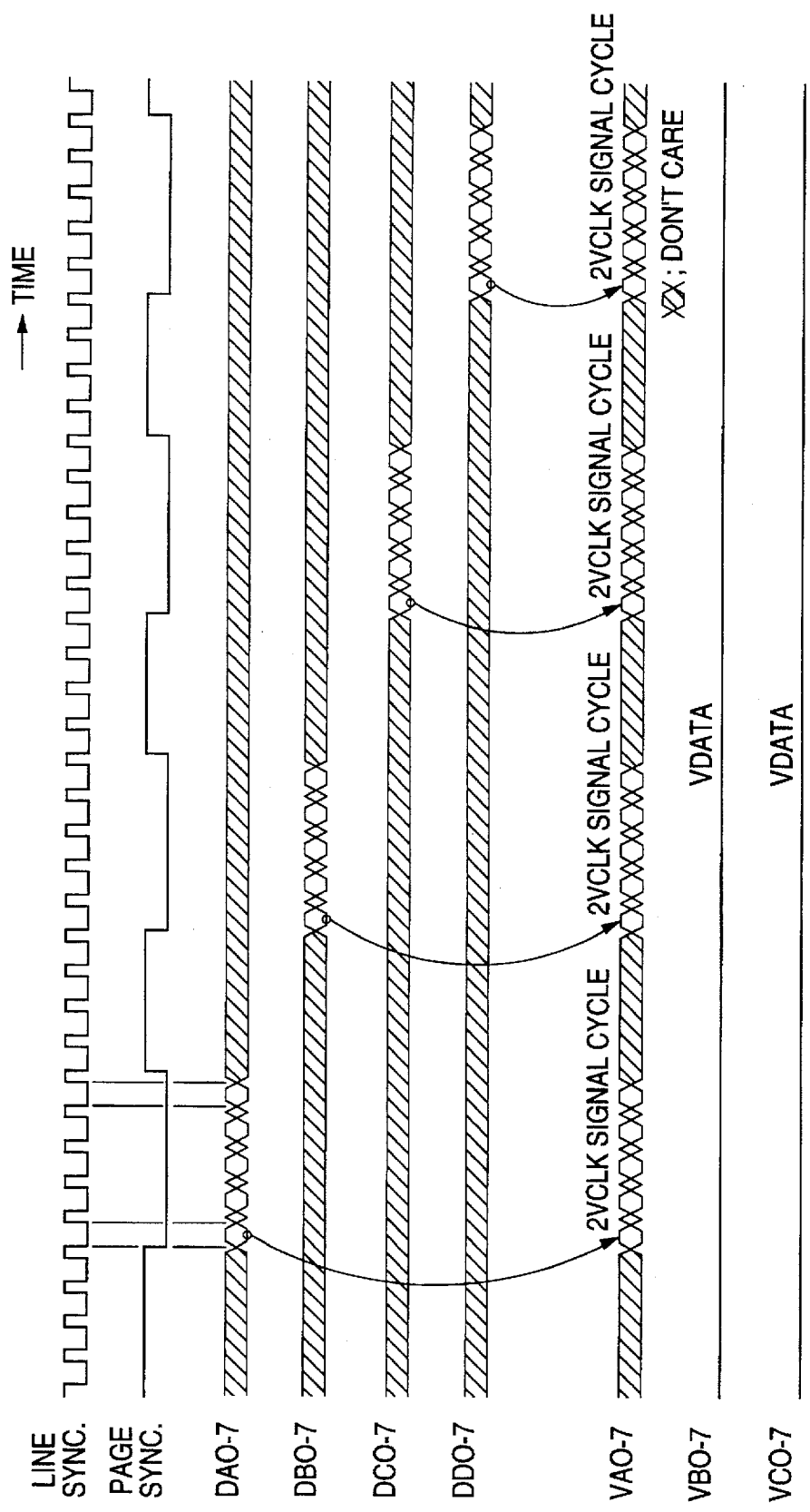
FIG. 14 is a diagram for explaining the data transfer.

FIG. 14 shows data transfer when the bits (D7, D6) shown in FIG. 7 are set to be (1 0). The data of the buses DA0-7, DB0-7, and DC0-7 on the memory side are transferred to the buses VA0-7, VB0-7, and VC0-7 on the IPS side in the period of three cycles of the page synchronizing signal.

Figure 15:
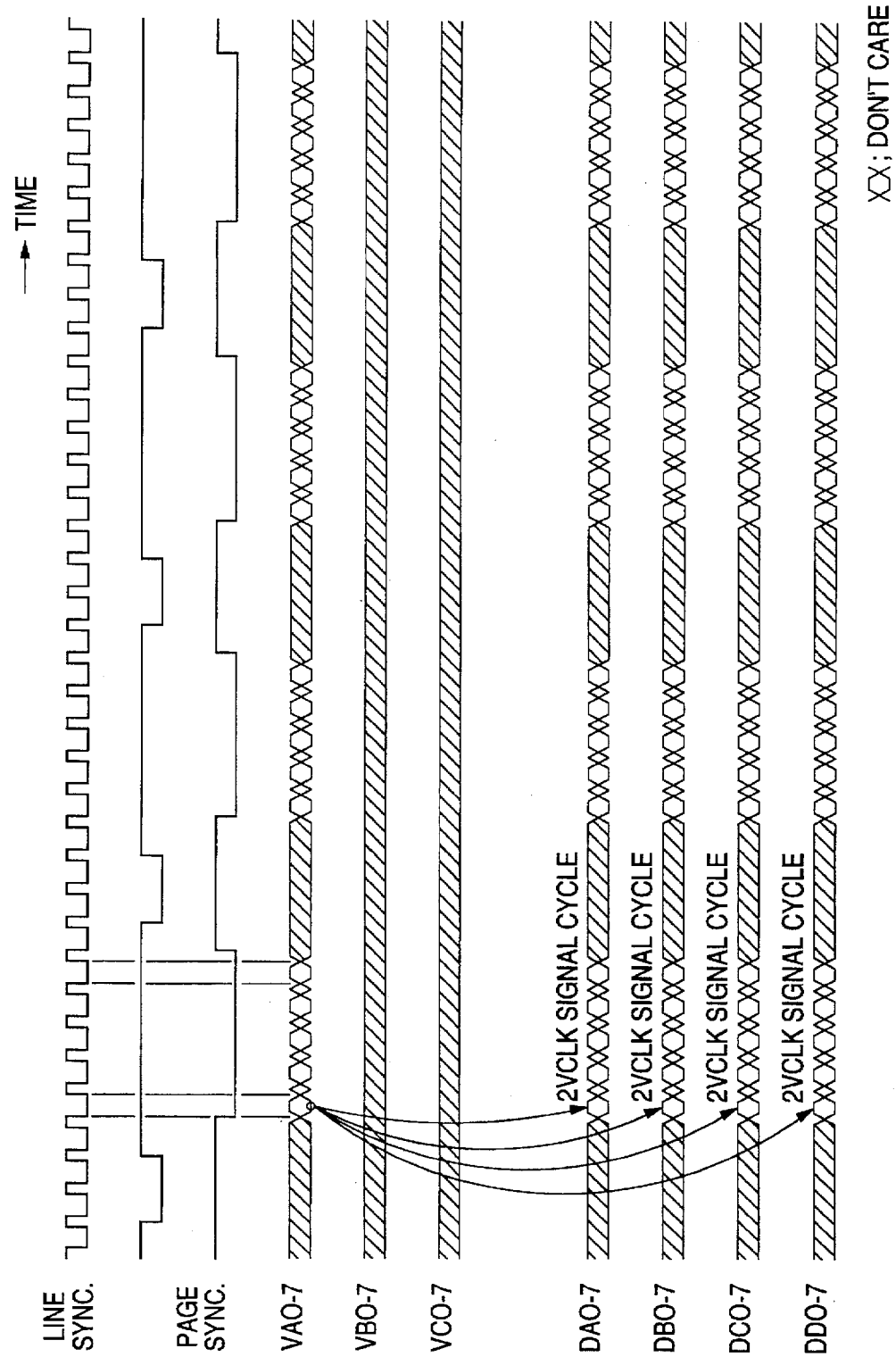
FIG. 15 is a diagram for explaining the data transfer.

FIG. 15 shows data transfer when the bits (D7, D6) shown in FIG. 7 are set to be (1, 1). The data of the buses VA0-7 on the IPS side are transferred sequentially area by area to the buses DA0-7, DB0-7, DC0-7 and DD0-7 on the memory side. In this case, control is made as follows.

In this case where the data on the IPS side are transferred sequentially area by area to the buses on the memory side, as shown in FIG. 15, the data on the buses VA0-7 are transferred to all the buses DA0-7, DB0-7, DC0-7 and DD0-7.

Figure 16:
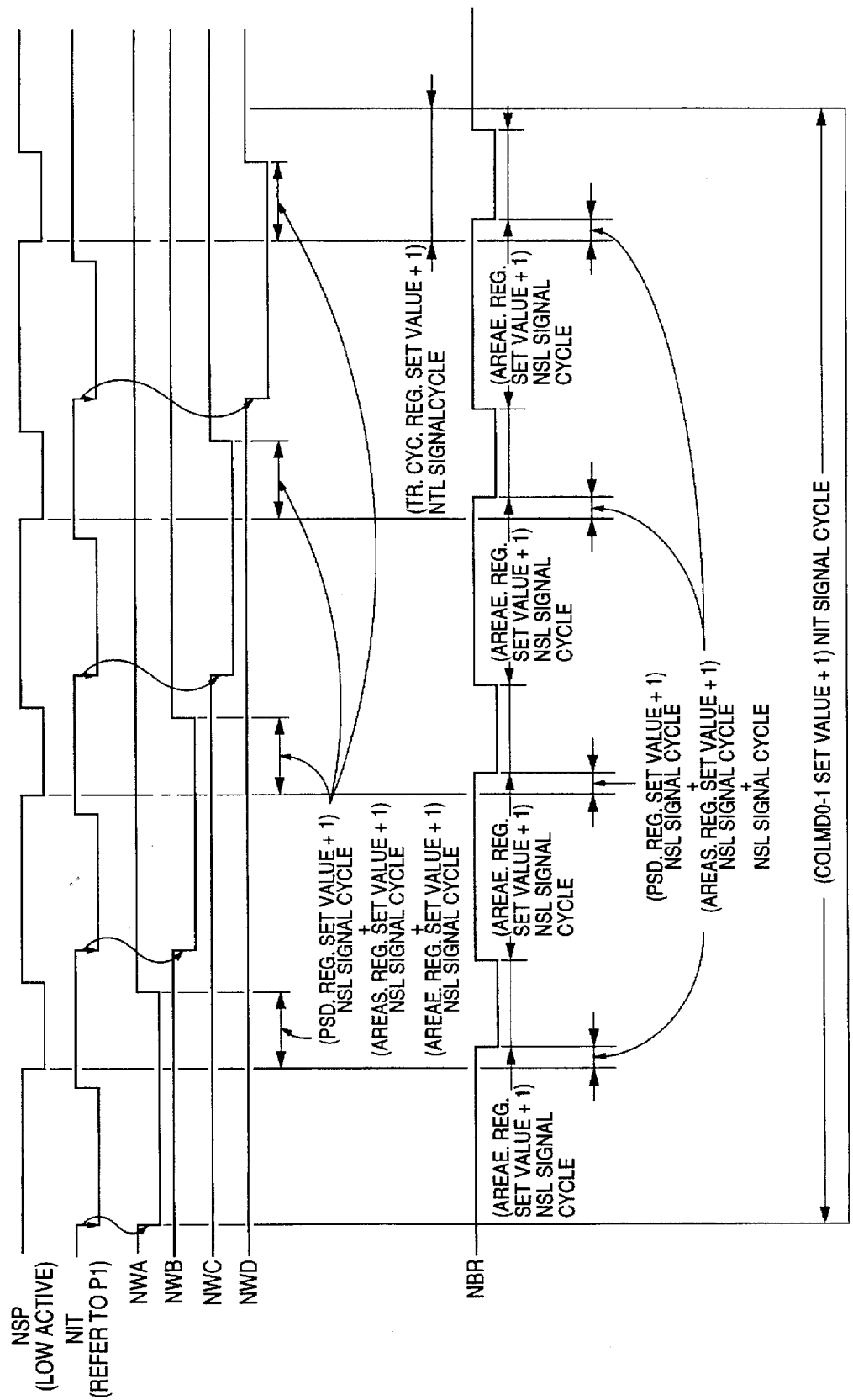
FIG. 16 is a diagram for explaining the data transfer sequentially area by area.

On the other hand, signals NWA, NWB, NWC, and NWD are outputted as shown in FIG. 16 from the scan-converter controller 51 shown in FIG. 4. Signals NWA, NWB, NWC, and NWD are write enable signals which are connected to the respective to the scan converters 13 of FIG. 3 so that the scan converters 13 operate to write the data on the buses DA0-7, DB0-7, DC0-7, and DD0-7 only when those write enable signals become low. For example, in FIG. 16, the write enable signals become low in the order of NWA→NWB→NWC→NWD so that the scan converters operate in the order of the scan converter A→the scan converter B→the scan converter C→the scan converter D so that data are written into the respective image memories sequentially area by area. Although the write enable signals become low in the order of NWA→NWB→NWC→NWD in this example, the order may be freely changed by the set point of the inner register.

As described above, according to the present invention, the output data of an external apparatus such as a copying machine can be written into the image memory on real time and the data of the image memory can be transferred to the external apparatus, only by setting values in the inner register without changing the system configuration. Further, only one bus controller is required so that the size of the substrate can be reduced and the size of the system can be made small.

The technical idea of the present invention simplifies the circuit construction when the nonlinear operation unit is realized by an analog circuit, and reduces an error arising from temperature variation and the circuit per se and computing time. The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for controlling the input and output of data between an external device and an image memory, comprising:

three lines of n-bit bidirectional data buses connected to the external device;

four lines of n-bit bidirectional data buses connected to the image memory;

a first inner register for setting a data transfer direction of each of the bidirectional data buses; and a second inner register for setting an image valid area;

wherein:

a set point of the first inner register sets the data transfer direction of each of the bidirectional data buses and sets a data input/output mode of the apparatus for data transfer between the three lines of n-bit bidirectional data buses connected to the external device and the four lines of n-bit bidirectional data buses connected to the image memory; and a set point of said second inner register sets the image valid area.

2. An image input/output control apparatus comprising:

three lines of n-bit bidirectional data buses connected to the external device;

four lines of n-bit bidirectional data buses connected to an image memory;

a first inner register for setting a data transfer direction of each of the bidirectional data buses; and a second inner register for setting an image valid area;

wherein:

a set point of the first inner register sets the data transfer direction of each of the bidirectional data buses and sets a data input/output mode of the apparatus for data transfer between the three lines of n-bit bidirectional data buses connected to the external device and the four lines of n-bit bidirectional data buses connected to the image memory, and wherein the set point of the first inner register sets a plurality of modes including:

a first mode in which data inputted to one of the three lines of bidirectional data buses connected to the external device are supplied sequentially one line by one line to the four lines of bidirectional data buses connected to the image memory;

a second mode in which data inputted sequentially one line by one line to the four lines of bidirectional data buses connected to the image memory are supplied to one of the three lines of bidirectional data buses connected to the external device;

a third mode in which data inputted concurrently to the three lines of bidirectional data buses connected to the external device are supplied to three of the four lines of bidirectional data buses connected to the image memory; and a fourth mode in which data inputted to three of the four lines of bidirectional data buses connected to the image memory are supplied concurrently to the three lines of bidirectional data buses connected to the external device; and a set point of said second inner register sets the image valid area.

3. The apparatus of claim 1, wherein said first inner register is an 8-bit register.

* * * * *

UNITED STATES PATENT AND TRADEMARK OFFICE
CERTIFICATE OF CORRECTION

PATENT NO. : 5,717,874
DATED : February 10, 1998
INVENTOR(S) : Masahiro ISHIWATA It is certified that error appears in the above-indentified patent and that said Letters Patent is hereby corrected as shown below:

On the title page, item [54] and column 1, line 5, "MODER" should read --MODE--.

Signed and Sealed this

Twenty-fourth Day of November, 1998

Attest:

BRUCE LEHMAN

*Attesting Officer*  Commissioner of Patents and Trademarks